US006352750B1

(12) United States Patent
Kanetake

(10) Patent No.: US 6,352,750 B1
(45) Date of Patent: Mar. 5, 2002

(54) SEAMLESS TUBULAR ELECTRICALLY-SEMICONDUCTIVE AROMATIC POLYMIDE FILM AND PROCESS FOR PRODUCING THE SAME

(75) Inventor: Junya Kanetake, Moriyama (JP)

(73) Assignee: Gunze Limited, Kyoto-fu (JP)

( * ) Notice: Subject to any disclaimer, the term of this patent is extended or adjusted under 35 U.S.C. 154(b) by 0 days.

(21) Appl. No.: 09/638,317

(22) Filed: Aug. 14, 2000

(30) Foreign Application Priority Data

Aug. 12, 1999 (JP) ............................................. 11-228693

(51) Int. Cl.$^7$ ............................ B32B 1/08; B29C 47/02; B29C 55/22
(52) U.S. Cl. ..................... 428/36.9; 428/34.1; 428/35.7; 428/36.92; 428/338; 428/473.5; 264/209.1; 264/209.5
(58) Field of Search ................................ 428/34.1, 36.9, 428/473.5, 35.7, 36.92, 338; 264/209.1, 209.5

(56) References Cited

U.S. PATENT DOCUMENTS

| 5,021,036 A | 6/1991 | Tanaka et al. ............... 474/237 |
| 5,389,412 A | 2/1995 | Tanaka et al. ............ 264/209.1 |
| 6,001,440 A | 12/1999 | Miyamato et al. ......... 428/36.9 |

FOREIGN PATENT DOCUMENTS

| EP | 0 929 011 A1 | 7/1999 | |
| JP | 362280075 A | * | 12/1987 |
| JP | 63 311263 | | 12/1988 |
| JP | 363311263 A | * | 12/1988 |
| JP | 5-77252 | | 3/1993 |
| JP | 05 200904 | | 8/1993 |
| JP | 07 295396 | | 11/1995 |
| JP | 08 176319 | | 7/1996 |
| JP | 408176319 A | * | 7/1996 |
| JP | 10-296826 | | 11/1998 |

* cited by examiner

Primary Examiner—P. Hampton-Hightower
(74) Attorney, Agent, or Firm—Knobbe, Martens, Olson & Bear, LLP

(57) ABSTRACT

The present invention provides an seamless tubular electrically-semiconductive film excellent in heat resistance, chemical resistance and mechanical property with excellent electrical resistance properties being applied thereto. The seamless tubular electrically-semiconductive film comprises carbon black having a volatile content of 10–25% which consists mainly of volatile acidic ingredients having a pH of not more than 4. Combination of the polyimide having a Tg of 210–350° C. and a surface oxidation-treated carbon black is preferred since the combination enables to easily obtain the film wherein a surface resistivity/volume resistivity ratio is not more than two digits, and variation in the surface resistivity caused by an applied voltage for charging is nor more than half a digit. The film is produced, for example, by centrifugal casting. The film is remarkly advantageous as an intermediate transfer belt in a color copying machine.

7 Claims, No Drawings

SEAMLESS TUBULAR ELECTRICALLY-SEMICONDUCTIVE AROMATIC POLYMIDE FILM AND PROCESS FOR PRODUCING THE SAME

FIELD OF THE INVENTION

The present invention provides an seamless tubular electrically-semiconductive aromatic polyimide film having, in particular, electrical resistance properties (surface resistivity, volume resistivity and dielectric strength) improved in stability and a process for producing the film. The film is used remarkably advantageously as, for example, an intermediate transfer belt member in a color copying machine employing an intermediate transfer system.

BACKGROUND OF THE INVENTION

In the field of color copying, for example, a copying system using an intermediate transfer belt (hereinafter referred to as "intermediate transfer system") is known and part thereof is put to practical use. In the intermediate transfer system, which is different from the xerography method wherein a color toner image formed on a photosensitive drum is transferred in sequence to be directly fixed on a transfer paper, a plurality of toner images are transferred firstly onto an electrically-semiconductive belt which is electrostatically charged and mounted between a photosensitive drum and a transfer paper, and then fixed on transfer papers.

The color copying techniques according to the intermediate transfer system attracts widespread attention since the techniques enable to reproduce images with maintaining high image quality, to lower the level of ozonization and to reproduce toner images on a wider range of image acceptors including cardboards, envelopes, etc., thereby serving for many uses.

It is known to use, as the intermediate transfer belt, an electrically-semiconductive seamless belt prepared by dispersing an electrically-conductive carbon black in a thermosetting polyimide. This electrically-semiconductive seamless belt is excellent in heat resistance, mechanical properties, chemical resistance and the like as compared to that made from other resins.

However, an seamless tubular film to which an electrical semiconductivity is imparted by dispersing an electrically-conductive carbon black in a thermosetting polyimide generally tend to be unstable in the electrical semiconductivity, i.e., in electrical resistance properties and, therefore, it is difficult to utilize such seamless tubular film with maintaining high quality thereof. For example, in the case where the seamless tubular film having the unstable electrical resistance properties is used as the intermediate transfer belt, toner scatter will occur to cause irregularity in image density and spots at non-image area, thereby deteriorating quality of reproduced images. Moreover, change in the applied voltage during a copying process immediately affects the quality of the reproduced images, so that constant quality of reproduced images cannot be achieved.

DISCLOSURE OF THE INVENTION

The present invention was accomplished as a result of extensive researches carried out to provide an seamless tubular electrically-semiconductive aromatic polyimide film improved in its quality and performance, to thereby solve the above-described problems.

The present invention is characterized by, as claimed in claim 1, an seamless tubular electrically-semiconductive aromatic polyimide film comprising an aromatic polyimide and an electrically-conductive carbon black having a volatile content of 10–25% which consists mainly of volatile acidic ingredients having a pH of not more than 4, which is capable of efficiently solving the above problems.

The aromatic polyimide may preferably have a Tg (glass transition temperature) of 210–350° C. (claim 2), and the electrically-conductive carbon black may preferably be treated by a surface oxidation (claim 3).

Pursuant to claims 2 and 3, a surface resistivity/volume resistivity ratio of the seamless tubular electrically-semiconductive aromatic polyimide film is easily regulated to be two digits ($10^2$) or less, preferably in the range of $1 \leq$ a surface resistivity/volume resistivity ratio $\leq 10^2$, thereby enabling to solve the above problems in a preferred manner.

Pursuant to claims 1–3, variation in the surface resistivity caused by variation in an applied voltage for charging is easily regulated to be half a digit or less, thereby enabling to solve the above problems in a preferred manner (claim 5).

Pursuant to claims 2 and 3, it is found that not only the surface resistivity/volume resistivity ratio tends to be within two digits or less, but also the variation in the surface resistivity caused by variation in an applied voltage for charging tends to be within half a digit or less, which is provided in claim 6. The triune relationship among the surface resistivity, the volume resistivity and the voltage applied for charging, which is established on the basis of the invention which is recited in claims 2 and 3, characterizes the invention as a whole from the viewpoint of solving the above problems in most effective manner.

In claim 7, there is provided a preferred embodiment of a process for the production of the seamless tubular electrically-semiconductive aromatic polyimide film as claimed in claims 1–6. The production process is excellent in producing an seamless tubular electrically-semiconductive aromatic polyimide film having a remarkably high surface smoothness and thickness precision (hereinafter referred to as "surface quality") as compared to others.

The invention will hereafter be described in detail.

As a resin to form a basis of the seamless tubular electrically-semiconductive aromatic polyimide film (hereinafter referred to as "SL film") of the invention is selected an aromatic polyimide in view of its excellent characteristics as compared to other resins as described above. The aromatic polyimide may preferably have a Tg (at second-order transition point) of about 210–350° C., more preferably about 250–350° C. Use of such aromatic polyimide enables to easily achieve stable electrical resistance properties which are imparted to the SL film by dispersing the electrically-conductive carbon black and to easily ensure the surface quality required for the SL film. Further, the SL film obtained by using the aromatic polyimide is so excellent in flexing resistance that dimensional change of the SL film after repetitive and long-term use can be made smaller.

Now that reasons why the aromatic polyimide having a Tg of 210–350° C. is preferred are as explained above, mechanism of action of the aromatic polyimide will hereafter be explained. Polyimide having a Tg in the above ranges has, as described specifically later on, 2 to 3 groups selected from —O—, —SO$_2$—, —CO— and alkylene groups, etc. in its aromatic group which is bound to an imide group. Therefore, there occurs a weak bond similar to a hydrogen bond between the selected groups and the volatile acidic ingredients having a pH of not more than 4, preferably 1.5–3.5, which are contained in the carbon black, thereby producing a greater affinity for each other and achieving a state of dispersion improved in uniformity and stability. As a result, the electrical resistance properties are improved. Further, the polyimide itself acquires flexibility and, therefore, even if there are imide rings formed in the polyimide, i.e. even if the polyimide is not in the state of a poly(amic acid) which is a precursor thereof, the polyimide shows solubility for an organic polar solvent (aprotic organic solvent such as N-methylpyrrolidone, dimethylacetoamide and dimethylformamide). As a result, the polyimide enables to improve the surface precision of the SL film and to carry out imidation at a lower temperature.

The followings are specific examples of the aromatic polyimide. The aromatic polyimide having a Tg of higher than 350° C. may be a polyimide (Tg 500° C.) obtained from 3,3',4,4'-biphenyl-tetracarboxylic dianhydride and p-phenylenediamine, a polyimide (Tg 420° C.) obtained from pyromellitic dianhydride and 4,4'-diaminodiphenylether, etc. The aromatic polyimide having a Tg of 210–350° C. may be a polyimide (Tg 303° C.) obtained from 3,3',4,4'-biphenyl-tetracarboxylic dianhydride and 4,4'-diaminodiphenylether and a polyimide (Tg 270° C.) obtained from pyromellitic dianhydride and 4,4'-bis(3-aminophenoxy)biphenyl, a polyimide (Tg 264° C.) obtained from 3,3',4,4'-benzophenone-tetracarboxylic dianhydride and 3,3'-diaminobenzophenone, a polyimide (Tg 240° C.) obtained from 3,3',4,4'-biphenyl-tetracarboxylic dianhydride and 3,3'-diaminodiphenylsulfone, a polyimide (Tg 215° C.) obtained from isopropylidene-bis(4-phenyleneoxy-4-phtalic dianhydride) and p-phenylenediamine, a polyamideimide (Tg 288° C.) obtained from trimellitic anhydride and 4,4'-diaminodiphenylether, etc.

Explanations are hereafter given on the electrically-conductive carbon black to be mixed with and dispersed in the aromatic polyimide, whose volatile acidic ingredients mainly have a pH of not more than 4, preferably not more than 3.5 and correspond to a volatile content of 10–25%, preferably 13–20% (hereinafter referred to simply as "CB").

First of all, it should be noted that not all types of carbon black can be used in the invention. CB to be used in the invention is required to have a volatile content of 10–25% and main ingredients of the volatile component are acidic ingredients having a pH of not more than 4.

The volatile component is an exhalation obtained by heating an electrically-conductive carbon black (having a surface resistivity substantially of $10^{-1}$–$10^4$ $\Omega/\square$) at a temperature of 950° C. for 7 minutes. Generally, a carbon black is produced by burning under certain conditions (e.g. incomplete combustion) a raw material (e.g. natural gas, acetylene, anthracene, naphthalene, coal tar, aromatic petroleum fraction). It is said that the exhalation corresponds to byproduct organic oxides (carboxyl, hydroxyl, quinone, lactone, etc.) produced in the carbon black production process, which remain as being bound to or adhered to carbon black particles. Therefore, the byproduct organic oxides and content thereof in the resulting carbon black vary depending on the production conditions; however, the byproducts which act as the acidic ingredients are assumed to be an organic ingredient derived from carboxyl and hydroxyl (it is considered that the pH of not more than 4 is achieved by these ingredients).

CB as specified above is selected from the carbon blacks having various volatile components in various ratios of content described above. A certain pH value, or acidity, is necessary for achieving the dispersibility between the aromatic polyimide and CB and for achieving the electrical resistance properties which are imparted by the dispersibility as described above. Accordingly, the pH of not more than 4 is specified to achieve the electrical resistance properties as a remarkable effect of the invention, to thereby solve the aforementioned problems. If CB contains a large amount of volatile ingredients having a pH of higher than 4, the effect of the invention cannot be produced to the fullest extent. Further, it is important to have a total amount of the volatile content in the range of 10–25% as well as to contain the volatile acidic ingredients having a pH of not more than 4. Moreover, the total amount of the volatile component preferably consists mainly of the acidic volatile ingredients. This "mainly" means not less than 50%. In the case where the volatile component consists mainly of the volatile acidic ingredients having a pH of 4 or less, a total amount of the volatile content of less than 10% is not satisfactory from the viewpoint of the effect produced by achieving the specific electrical resistance properties imparted by the specific dispersibility. To the contrary, in the case where the total amount of the volatile content is more than 25%, the amount of the volatile acidic ingredients exceeds the required amount, to thereby deteriorate durability and surface smoothness (subtle unevenness) of the SL film.

In addition, CB to be used in the invention is preferably in the form of particles each having a specific surface area of 100–500 m$^2$/g with an average diameter of about 1–50 μm.

The volatile component in CB is produced as a byproduct as a result of the combustion as mentioned above. In the case where the volatile content thus produced is not within the specific range, it is possible to produce the volatile content actively to obtain CB having the specific volatile content. This production process is an oxidation treatment of CB surfaces using, for example, NO gas, nitric acid, hydrogen peroxide, sodium hypochlorite, potassium persulfate, ozone or the like. This active oxidation treatment is preferred since, in the treatment, functional groups having an organic acidic group such as carboxyl group, hydroxyl group or the like is bound directly to CB as if it is grafted or an organic compound having the functional group generates to be actively taken into CB as being adhered to the CB surfaces.

The SL film of the above-described features has an electrical conductivity which corresponds to the electrical resistance properties wherein the surface resistivity is about $10^5$–$10^{16}$ $\Omega/\square$ and the volume resistivity is about $10^4$–$10^{15}$ $\Omega\cdot$cm. Preferably, the surface resistivity/volume resistivity ratio is within two digits or less so that the electrical resistance properties are improved in stability. For example, use of such SL film as an intermediate belt member in a color copying machine enables to provide color image reproduction excellent in quality of reproduced images (free from deterioration of the image quality caused by toner scattering) constantly and for a long period of term. In addition, the use of the SL film will offer a subordinate advantage that a corotron, a static eliminator, is no longer necessary.

"The surface resistivity/volume resistivity ratio is within two digits or less" means that the volume resistivity is within the range of $10^{10}$–$10^{12}$ $\Omega\cdot$cm when the surface resistivity is $10^{12}$ $\Omega/\square$, for example.

The SL film has the electrical resistance properties which are not affected so much by variation in the applied voltage for charging: however, it is more advantageous to use the SL film wherein the range of variation in the surface resistivity is within half a digit (which means that the range of variation in the surface resistivity is from $1\times10^{12}$ $\Omega/\square$ to $6\times10^{12}$ $\Omega/\square$, for example) since such SL film does not change in the electrical resistance properties even if the applied voltage changes sharply, for example, from 100 V to 1000 V. Therefore, the SL film having such surface resistivity will be a more advantageous member, as is the same as the SL film having the electrical resistance properties described above, in use applications where electrostatic charge is required at all times. For example, in the case where such SL film is used as an intermediate transfer belt, the surface resistivity does not substantially change even if an applied voltage changed owing to some cause halfway through a copying procedure from 100 V to 300 V, 500 V, 700 V, 1000 V, etc.; therefore, substantial change does not occur in an amount of electrostatic charge in the intermediate transfer belt. Consequently, toner images formed on a photosensitive drum are transferred stably on the belt as they are without fail to be printed on image acceptors, thus to eliminate troubles relating to the deterioration in quality of reproduced images which are caused by the change in the applied voltage.

Moreover, in the SL film of the above-described structure, when the surface resistivity/volume resistivity ratio is not more than two digits and the variation in surface resistivity caused by variation in an applied voltage for charging is not more than half a digit, such SL film will be the most excellent intermediate transfer member from the viewpoint of total evaluation among the surface resistivity, volume resistivity and applied voltage for charging. Accordingly, use of the SL film as an intermediate transfer belt enables to omit a charge eliminating operation using a corotron and to solve problems such as irregularity in image density caused by the change in the applied voltage and deterioration in image quality caused by toner scattering, to thereby provide constant image reproduction for a long period of term.

A process for the production of the SL film will be illustrated in the following.

First, the aromatic polyimide is prepared by polycondensation reaction of equimolar amounts of the aromatic dianhydride and aromatic diamine in the organic polar solvent. When using the aromatic polyimide which becomes insoluble to the solvent when the reaction proceeds to the imide ring closure, the reaction is stopped at the stage of a poly(amic acid) to use the reaction solution as a bulk solution to be molded in the succeeding step. In the case of using an aromatic polyimide which is soluble to the solvent even after a part thereof or whole part thereof proceeds to the imide ring closure, it is preferable to allow the imide ring closure reaction to proceed in the solvent to prepare the bulk solution for molding.

In addition, the reaction may be stopped in the stage of poly(amic acid) by controlling a temperature of the reaction. When the reaction temperature is not more than ordinary temperature, the reaction stops at the poly(amic acid) stage without proceeding to the imidation.

Next, to the aromatic polyimide bulk solution or the aromatic poly(amic acid) bulk solution thus obtained is added CB as specified above in an amount of 5–35 wt. % (based on a solid content of the polyimide or poly(amic acid)), preferably 10–25 wt. %, followed by dispersion of CB to give a bulk solution for molding. The range for the amount of CB to be added is decided in view of the electrical semiconductivity, i.e., so as to impart to a resulting SL film a surface resistivity of about $10^5$–$10^{16}$ $\Omega/\square$, preferably $10^7$–$10^{14}$ $\Omega/\square$ and a volume resistivity of about $10^4$–$10^{15}$ $\Omega \cdot cm$, preferably $10^6$–$10^{13}$ $\Omega \cdot cm$. Especially, the upper limit was decided in view of physical properties of the polyimide and smoothness of a resulting SL film. If the upper limit exceeds 35 wt %, the physical properties and the smoothness are tend to be deteriorated.

Generally, the carbon black is mixed and dispersed coarsely by using a stirrer with agitating blade, and then mixed and dispersed perfectly by means of a ball mill. During the mixing and dispersing by the ball mill, the organic polar solvent may be added as required to adjust viscosity of the mixture so that the mixture is suitably used as a solution for molding. It is not seldom for heat to occur during this mixing and dispersing step; therefore, it is necessary to carry out the mixing and dispersing with controlling the temperature so as not to evaporate the solvent. Furthermore, the least amount of an additive (e.g. a surfactant containing fluorine for accelerating dispersibility of the carbon black, a fluororesin to impart release properties, a ceramic-based thermal conductivity accelerator to impart thermal conductivity) may be added as required.

Subsequently, the aromatic polyimide solution or aromatic poly(amic acid) solution containing the electrically-conductive carbon black is subjected to molding.

The molding is carried out in such a manner that the mixture is extruded out via a slit nozzle, for example, on a rotating metal belt to be in the form of a film, followed by heating to give the film in the shape of a web. The film is then cut into pieces each having a predetermined length, followed by connecting both ends of the cut film. In another method of molding, the solution is sprayed on an outer surface of a rotating metal drum, followed by heating to obtain an SL film by one continuous process. In another method of molding, the solution is sprayed on an inner surface of a rotating metal drum to be molded in the form of an seamless tube, followed by heating to obtain an SL film (hereinafter referred to as "method R"). Among the above molding methods, the method R is preferred since the SL film obtained by the method R is remarkably high in surface smoothness and thickness precision. The method R is described in detail in the following.

A molding apparatus to be used in the method R comprises, for example, a metal drum mounted on four revolving rollers. The inner surface of the drum is mirror-finished. A far infrared radiation heater is provided externally for heating the inner surface by heating an outer surface of the drum. A heater is embedded in the molding apparatus for heating the revolving rollers. A slit-shaped nozzles with a metering pump is provided in the drum to automatically supply the molding solution to the inner surface of the drum. The solution is supplied via the nozzle in the form of a liquid in some cases or in the form of spray in other cases. The nozzle moves bilaterally from one edge to another in accordance with a rotational speed and has an installation and removal mechanism so as to be taken out of the drum. Further, a discharge device is provided removably in the drum for discharging an evaporated organic polar solvent out of the system. Moreover, bearers for preventing the solution from leakage are provided peripherally on both edges of the inner surface of the drum.

In the case where the solution is supplied in the form of a liquid, the drum is necessarily rotated at such a high speed that the centrifugal force occurs to cast the solution uniformly on the inner surface, whereas in the case where the solution is supplied in the form of spray, the drum may be rotated at such a low speed that the centrifugal force does not occur. Generally, in a film obtained by the molding under the influence of the centrifugal force, an electrically-conductive carbon black contained therein tends to be gathered at the film surface. However, the present invention is free from such unevenness and, according to the invention, the carbon black is distributed uniformly in both of the directions of thickness and rotation. It goes without saying that such advantage is achieved by the combination of the two specific components as described above; however, the strong affinity between the components as described above also contributes thereto.

Thus, the SL film is molded under either one of the conditions (with or without centrifugal force) by means of either one of the molding apparatuses. It is advisable to set viscosity of the solution, feed rate, and rotational speed of drum before starting a molding process since they vary depending on the conditions of the molding process. It is advisable to change the heating temperature depending on the following two cases. In the case of using the aromatic polyimide having a Tg of 210–350° C. or corresponding poly(amic acid), the heating temperature is gradually elevated up to 300° C. to completely remove the organic polar solvent and to accomplish the imidation to obtain a target SL film at a single step of heating. Generally, a high temperature (350–450° C.) is required to complete the imidation; however, the polyimide having the Tg of 210–350° C. is characterized in that the imidation is completed at a temperature not more than 300° C. Therefore, in the present invention, it is possible to carry out the casting, evaporation of solvent and imidation by the single step of heating.

To the contrary, the aromatic polyimide having a Tg of not less than 400° C. does not dissolve to the solvent; therefore, a solution of poly(amic acid) which is soluble to the solvent is used as a raw material to be molded in the case of using such aromatic polyimide. The poly(amic acid) solution is supplied to the drum, followed by heating to a temperature where the imidation does not occur substantially, for example 200° C. or less, to thereby give a poly(amic acid) film wherein remains a certain amount of the solvent. The film is then fitted on the outside of a cylindrical metal mold, for example, followed by heating at a temperature of 400° C. for complete removal of the solvent and imidation. Thus, the molding process is carried out by two steps of heating. If the temperature is elevated without a break to 400° C. inside the drum to carry out the imidation, there arise problems relating to the high temperature such as fine concavities and convexities like craters formed on the front and back surfaces of the resulting SL film and shrinkage in the circumference. Such phenomena are not observed in the SL films obtained by using the aromatic polyimides having a Tg of 210–350° C. (the front and back film surfaces are remarkably smooth). The phenomena are problems unavoidably arise in the imide ring closure carried out at a higher temperature.

The thickness of the SL film obtained by the above described process varies depending on the use application. For example, the thickness of the SL film is 70–150 $\mu$m when used as an intermediate transfer belt or an intermediate transfer belt usable for fixation; about 100–300 $\mu$m when used as other types of conveyer belts (such as a belt for transferring a printing paper placed in the copying machine, a belt for transferring other articles); about 50–150 $\mu$m when fitted on a roll core to use as being rolled.

In addition, when the SL film is used in a use application where release properties are required, there may be provided, on the surface of the belt, a layer having a high release properties comprising a fluororesin such as polytetrafluoro-ethylene or a resin having release properties.

The present invention having the features as described above achieves the following advantages.

The SL film obtained in accordance with the invention has a remarkably stable electric resistance properties wherein a slight difference is observed between the surface resistivity and the volume resistivity and the surface resistivity is not substantially influenced by variation in an applied voltage.

Use of the SL film having the above described characteristics as an intermediate transfer belt in a color copying machine of intermediate transfer system, for example, contributes to elimination of toner scattering during the transfer process, thereby improving quality of reproduced images (cleanliness, definition, etc.). Further, an amount of electrostatic charge of the belt does not change even if the voltage applied thereto for charging changes during the copying process; therefore, the belt does not cause any changes in the quality reproduced images (e.g. density irregularity), thereby offering a reliable color copying performance.

In addition, the SL film of the invention is excellent in heat resistance, chemical resistance, mechanical properties and environment resistance. Therefore, in view of the aforementioned electrical resistance properties, the SL film will be developed for use in various applications which requires such properties.

BEST MODE FOR CARRYING OUT THE INVENTION

The invention will be illustrated in detail with reference to comparative examples and examples. Note that the surface resistivity, the volume resistivity and the variation in surface resistivity caused by variation in applied voltage for charging (hereinafter referred to as applied voltage dependency) are measured in such a manner as given below.

Surface Resistivity and Volume Resistivity

Measurements were carried out by means of a resistivity meter ("Hiresta": product of Mitsubishi Yuka Kabushiki Kaisha); using samples each having a thickness of 80 (±5) $\mu$m prepared from SL films obtained in the comparative examples and examples; with 10 measurement points with an equal interval therebetween; and with an applied voltage of 100 V. The average surface resistivity and volume resistivity were calculated with respect to each samples.

Applied Voltage Dependency

Surface resistivity was measured by means of Hiresta, which is the same resistivity meter as mentioned above, under applied voltages of 100 V and 1000 V to observe the difference caused by the change in the applied voltage. The smaller the difference between the detected surface resistivity, the more stable the electric resistance properties are.

EXAMPLE 1

Aromatic Polyimide Having TG of 500° C. Insoluble to Organic Polar Solvent

To a poly(amic acid) solution (solid concentration of 18 wt %) prepared by polycondensation reaction of equimolar amounts of 3,3',4,4'-biphenyl-tetracarboxylic dianhydride and p-phenylenediamine in N-methylpyrrolidone at a temperature of 18° C. was added CB which was subjected to an oxidation treatment to have a pH of 3 and a volatile content of 14% (particle size of 25$\mu$m; specific surface area 180 m$^2$/g) in such an amount that a ratio thereof to the solid content of the poly(amic acid) was 14 wt %, followed by mixing coarsely in a stirrer with agitating blades. The coarse mixture was transferred to a ball mill to be mixed and dispersed thoroughly at a temperature of not more than 60° C. Viscosity of the dispersion thus obtained was 400 cP (hereinafter referred to as "Bulk Solution A").

Next, using Bulk Solution A, a poly(amic acid) seamless tubular film (hereinafter referred to as "PA film") was molded by means of the molding apparatus described above under the following conditions.

Molding Drum: Metal drum having a mirror-finished inner surface, an inner diameter of 200 mm, a width of 550 mm.

Supply of Bulk Solution A: 300 g thereof was supplied automatically to the drum being rotated slowly.

Rotational Speed—Molding Temperature—Molding Time: At the same time with the start of heating the drum, rotation of the drum was accelerated gradually in such a manner that a number of revolutions reached 700 rpm when the temperature reached 120° C. After maintaining the temperature (120° C.) and the rotational speed (700 rpm) for 120 minutes, the heating was ceased and then the temperature was cooled to ordinary temperature with rotation. The PA film thus obtained was peeled off from the drum.

The PA film (a trace amount of N-methylpyrrolidone remained therein) was then fitted on the outside of a cylindrical metal mold having a mirror-finished inner surface, an outer diameter of 195 mm and a length of 400 mm, and the mold was placed in a hot air dryer. Temperature in the dryer was elevated gradually up to 400° C. and, after that, the temperature was maintained for 20 minutes. The mold with film was then taken out of the dryer and cooled to ordinary temperature. The molded film was released from the mold. The molded film thus obtained was a SL film wherein the solvent was removed perfectly and the imidation was completed.

Surfaces of the SL film were not perfectly smooth due to very fine concavities and convexities. The SL film had a thickness of 80±4 μm, an inner diameter of 195 mm, a surface resistivity of $7.3 \times 10^{10}$ Ω/□, a volume resistivity of $3.1 \times 10^9$ QΩ·cm. With respect to an applied voltage dependency, a surface resistivity at 100 V of applied voltage was $7.3 \times 10^{10}$ Ω/□, whereas that at 1000 V of applied voltage was $1.9 \times 10^{10}$ Ω/□.

In addition, a surface resistivity measured at a voltage of 1000 V after 5000 times of alternate applications of voltages of 100 V and 1000 V for 5000 times was $8.1 \times 10^9$ Ω/□.

EXAMPLE 2

Aromatic Polyimide Having Tg of 303° C. Soluble to Organic Polar Solvent

Used was an aromatic poly(amic acid) solution (solid concentration of 18 wt %) prepared by polycondensation reaction of equimolar amounts of 3,3',4,4'-biphenyl-tetracarboxylic dianhydride and 4,4'-diaminodiphenylether in N-methylpyrrolidone at a temperature of 20° C. To the aromatic poly(amic acid) solution thus obtained, CB and N-methylpyrrolidone were added and mixed thoroughly therewith under the same conditions as that in Example 1 to give a bulk solution for molding (hereinafter referred to as "Bulk Solution B"). Viscosity of Bulk Solution B was 460 cP.

Next, using Bulk Solution B, a seamless tubular aromatic polyimide film (hereinafter referred to as "PI film") was molded by means of the molding apparatus described above under the following conditions.

Molding Drum: Metal drum having a mirror-finished inner surface, an inner diameter of 200 mm, a width of 550 mm.

Supply of Bulk Solution B: 300 g thereof was supplied automatically to the drum being rotated slowly.

Rotational Speed—Molding Temperature—Molding Time: At the same time with the start of heating the drum, rotation of the drum was accelerated gradually in such a manner that the number of revolutions reached 700 rpm when the temperature reached 120° C. After reaching the temperature (120° C.) and the rotational speed (700 rpm), the state was maintained for 120 minutes to remove a major part of N-methylpyrrolidone by evaporation. Then, the temperature was elevated to 300 ° C., which was maintained for 1 hour. After that, the heating was ceased and then the temperature was cooled to ordinary temperature with rotation. PI film thus obtained was peeled off from the drum.

The surface of the PI film was smooth and free from the convexities and concavities observed in Example 1. The PI film had a thickness of 80±2 μm, an inside diameter of 195 mm, a surface resistivity of $8.1 \times 10^{10}$ Ω/□ and a volume resistivity of $9.6 \times 10^9$ Ω·cm. With respect to an applied voltage dependency, a surface resistivity at 100 V was $8.1 \times 10^{10}$ Ω/□, while that at 1000 V was $6.9 \times 10^{10}$ Ω/□.

In addition, a surface resistivity measured at a voltage of 1000 V after 5000 times of alternate applications of voltages of 100 V and 1000 V was $6.5 \times 10^{10}$ Ω/□.

EXAMPLE 3

Example of Combination of Another Aromatic Polyimide and CB

Except for using an aromatic polyimide (Tg 264° C.) obtained from 3,3',4,4'-benzophenonetetracarboxylic dianhydride and 3,3'-diaminobenzophenone and an electrically-conductive carbon black which was subjected to an oxidation treatment to have a pH of volatile component of 2.5 and adjusted to have a volatile content of 18%, a dispersion was prepared in the same manner as that in Example 2, followed by molding, to thereby give an SL film by a single heating step. The SL film was then peeled off from the metal drum.

The surface of the SL film thus obtained was smooth and free from the convexities and concavities observed in Example 1. The SL film had a thickness of 80±3 μm, an inside diameter of 195 mm, a surface resistivity of $7.5 \times 10^{10}$ Ω/□ and a volume resistivity of $6.7 \times 10^9$ Ω·cm. With respect to an applied voltage dependency, a surface resistivity at 100 V was $7.5 \times 10^{10}$ Ω/□, while that at 1000 V was $6.9 \times 10^{10}$ Ω/□.

In addition, a surface resistivity measured at a voltage of 1000 V after 5000 times of alternate applications of voltages of 100 V and 1000 V was $6.3 \times 10^{10}$ Ω/□.

COMPARATIVE EXAMPLE 1

Except for using an electrically-conductive carbon black having a pH of 5.0 and a volatile content of 15% (particle size of 20 μm), preparation of a polyimide bulk solution and molding of an SL film were performed in the same manner as that in Example 2.

The SL film thus obtained had a thickness of 80±5 μm, an inside diameter of 195 mm, a surface resistivity of $8.9 \times 10^{10}$ Ω/□ and a volume resistivity of $2.0 \times 10^8$ Ω·cm. With respect to an applied voltage dependency, a surface resistivity at 100 V was $8.9 \times 10^{10}$ Ω/□, while that at 1000 V was $3.1 \times 10^9$ Ω/□.

In addition, a surface resistivity measured at a voltage of 1000 V after 5000 times of alternate applications of voltages of 100 V and 1000 V was $1.5 \times 10^{10}$ Ω/□.

COMPARATIVE EXAMPLE 2

Except for using an electrically-conductive carbon black having a pH of 3.5 and a volatile content of 7.5% (particle size of 22 μm), preparation of a polyamide bulk solution and molding of a seamless tubular aromatic polyimide film (hereinafter referred to as Com.-PI film) were performed in the same manner as that in Example 2.

The PI film thus obtained had a thickness of 80±2 μm, an inside diameter of 195 mm, a surface resistivity of $9.1 \times 10^{10}$ Ω/□ and a volume resistivity of $2.4 \times 10^8$ Ω·cm. With respect to an applied voltage dependency, a surface resistivity at 100 V was $9.1 \times 10^{10}$ Ω/□, while that at 1000 V was $3.3 \times 10^9$ Ω/□.

In addition, a surface resistivity measured at a voltage of 1000 V after 5000 times of alternate applications of voltages of 100 V and 1000 V was $7.0 \times 10^8$ Ω/□.

TEST EXAMPLE

Comparative Test of Color Copying

Each of the PI film obtained in Example 2 and PI film obtained in Comparative Example 2 was cut to have a width of 370 mm and processed to be an electrically-semiconductive intermediate transfer belt. Each of them was mounted on two revolving rollers provided in a color copying machine employing the intermediate transfer system, and a copying was performed under the following conditions to evaluate image quality.

Original document: 100 lines-50% dot and 50 lines with a constant pitch of 1 mm each having a width of 0.3 mm and a length of 200 mm.

Toner: Magenta.

Corotron was not used.

Printing: Printing paper having a size of A4.

In the case where the belt of Comparative Example 2 was used for copying, a density irregularity was observed in reproduced images of the dots from about 20th sheets of continuous copying, and, in the 100th sheet, there observed adhesions of scattered toner among the dots so that the reproduced images were irregular in density. In reproduced images of the lines, there occurred irregularity in density which looked like ghost images appeared between lines and, finally, scattered toner started to adhere between lines to look like a solid image.

On the other hand, in the case where the belt of Example 2 was used for copying, no density irregularity nor toner scattering was observed in reproduced images of the dots and lines, and densities and sizes of the reproduced images were almost the same as the original document.

In addition, 50000 sheets of copying were performed in the copying test using the belt of Example 2; however, no change was observed in the reproduced images.

What is claimed is:

1. An seamless tubular electrically-semiconductive aromatic polyimide film comprising an aromatic polyimide and an electrically-conductive carbon black having a volatile content of 10–25% which consists mainly of volatile acidic ingredients having a pH of not more than 4.

2. The seamless tubular electrically-semiconductive aromatic polyimide film according to claim 1, comprising an aromatic polyimide having a Tg of about 210–350° C.

3. The seamless tubular electrically-semiconductive aromatic polyimide film according to claim 1, wherein the electrically-conductive carbon black is a surface oxidation-treated carbon black.

4. The seamless tubular electrically-semiconductive aromatic polyimide film according to claim 1, wherein a surface resistivity/volume resistivity ratio is not more than two digits.

5. The seamless tubular electrically-semiconductive aromatic polyimide film according to claim 1, wherein variation in the surface resistivity caused by variation in an applied voltage for charging is not more than half a digit.

6. The seamless tubular electrically-semiconductive aromatic polyimide film according to claim 1, wherein the surface resistivity/volume resistivity ratio is not more than two digits, and the variation in the surface resistivity caused by an applied voltage for charging is not more than half a digit.

7. A method for the production of the seamless tubular electrically-semiconductive aromatic polyimide film according to claim 1, characterized by supplying a solution containing an aromatic polyimide or a corresponding poly(amic acid) thereof and an electrically-semiconductive carbon black having a volatile content of 10–25% which consists mainly of a volatile acidic ingredient having a pH of not more than 4 in an amount of 5–35 wt % based on the polyimide or poly(amic acid) to an inner surface of a rotating metal drum, followed by heating for molding the solution into an seamless tube.

* * * * *